(12) United States Patent
Bonzini et al.

(10) Patent No.: US 10,037,292 B2
(45) Date of Patent: Jul. 31, 2018

(54) SHARING MESSAGE-SIGNALED INTERRUPT VECTORS IN MULTI-PROCESSOR COMPUTER SYSTEMS

(71) Applicant: Red Hat Israel, Ltd., Raanana (IL)

(72) Inventors: Paolo Bonzini, Turate (IT); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 412 days.

(21) Appl. No.: 14/718,399

(22) Filed: May 21, 2015

(65) Prior Publication Data

US 2016/0342543 A1 Nov. 24, 2016

(51) Int. Cl.
*G06F 13/24* (2006.01)
*G06F 9/48* (2006.01)

(52) U.S. Cl.
CPC ............ *G06F 13/24* (2013.01); *G06F 9/4812* (2013.01)

(58) Field of Classification Search
CPC .................................. G06F 13/24; G06F 9/48
See application file for complete search history.

(56) References Cited

U.S. PATENT DOCUMENTS

| 6,738,847 | B1* | 5/2004 | Beale | G06F 13/24 710/260 |
|---|---|---|---|---|
| 7,496,706 | B2 | 2/2009 | Nguyen et al. | |
| 7,565,471 | B2 | 7/2009 | Butler et al. | |
| 8,392,623 | B2 | 3/2013 | Subramanian et al. | |
| 2003/0145175 | A1* | 7/2003 | Agatsuma | G06F 9/5033 711/147 |
| 2008/0155154 | A1 | 6/2008 | Kenan et al. | |
| 2008/0155571 | A1 | 6/2008 | Kenan et al. | |
| 2009/0183180 | A1* | 7/2009 | Nelson | G06F 9/45533 719/319 |
| 2012/0084487 | A1 | 4/2012 | Barde | |
| 2012/0203947 | A1* | 8/2012 | Tsirkin | G06F 13/24 710/269 |
| 2012/0254492 | A1* | 10/2012 | Li | G06F 13/24 710/269 |
| 2012/0317588 | A1* | 12/2012 | Saulsbury | G06F 9/45558 719/314 |

(Continued)

OTHER PUBLICATIONS

Ozaki, Ryota and Nakahara, Kengo, "Modernizing NetBSD Networking Facilities and Interrupt Handling", netbsd.org, 2015, 66 pages http://www.netbsd.org/gallery/presentations/ozaki-r/2015_AsiaBSDCon/ABC2015-P4C-slides.pdf.

(Continued)

*Primary Examiner* — Nimesh G Patel
(74) *Attorney, Agent, or Firm* — Lowenstein Sandler LLP

(57) ABSTRACT

Systems and methods for sharing message-signaled interrupt vectors in multi-processor computer systems. An example method may comprise: associating an interrupt vector with a first device component; associating the interrupt vector with the second device component; creating, in a first interrupt descriptor table (IDT) associated with a first processor, a first interrupt descriptor to reference a first interrupt service routine to process a first interrupt triggered by the first device component; and creating, in a second IDT associated with a second processor, a second interrupt descriptor to reference a second interrupt service routine to process a second interrupt triggered by the second device component, wherein the first interrupt descriptor and the second interrupt descriptor reference the interrupt vector.

15 Claims, 8 Drawing Sheets

(56) References Cited

U.S. PATENT DOCUMENTS

2014/0229647 A1 8/2014 Tsirkin et al.
2014/0337540 A1 11/2014 Johnson et al.

OTHER PUBLICATIONS

"Code Machine Security Research and Development", Catalog of key Windows kernel data structures, CodeMachine Inc., 2000-2014 pp. 1-19 http://codemachine.com/article_kernelstruct.html.
"Hardware Support and Directions for Windows Server", Microsoft Corporation, Sep. 19, 2011, 71 pages http://feishare.com/attachments/article/283/ServerDirectionsR2.pdf.

* cited by examiner

SHARING MESSAGE-SIGNALED INTERRUPT VECTORS IN MULTI-PROCESSOR COMPUTER SYSTEMS

TECHNICAL FIELD

The present disclosure is generally related to multi-processor computer systems, and is more specifically related to systems and methods for managing interrupts in multi-processor computer systems.

BACKGROUND

"Multi-processor computer system" herein shall refer to a computer system having a plurality of processors (e.g., hardware processors or virtual processors). One design aspect in a multi-processor computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
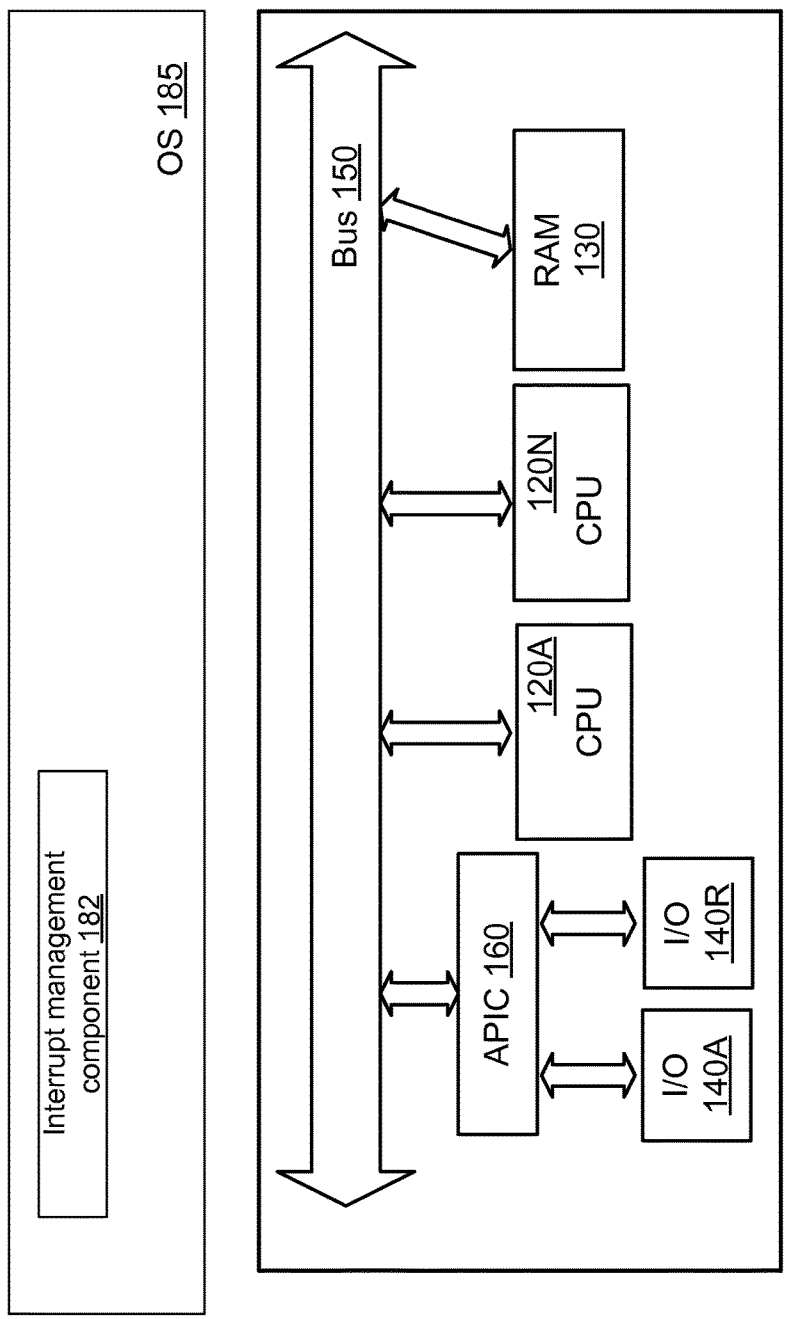
FIG. 1 depicts a high-level component diagram of an example computer system operating in accordance with one or more aspects of the present disclosure.

Described herein are methods and systems for sharing message-signaled interrupt vectors in multi-processor computer systems.

In a multi-processor computer system, interrupts may be processed by one or more interrupt controllers such as Advanced Programmable Interrupt Controllers (APICs), including one local APIC per processor and one or more input/output (I/O) APICs connected to I/O devices. Various computer systems may employ out-of-band and/or in-band interrupt signaling mechanisms. Out-of-band interrupt signaling involves asserting, by a peripheral device, a certain line of a control bus (referred to as an interrupt line) in order to signal an interrupt to the processor. Conversely, in-band interrupt signaling, also referred to as message signaled interrupts (MSI), involves transmitting, by a peripheral device, a message through the main data path (e.g., through a Peripheral Component Interconnect (PCI) bus).

The MSI mechanism allows a peripheral device to write certain data to a memory address. In one example, the memory address is mapped to a control register of an interrupt controller so that each combination of the address and data defines an interrupt vector and a destination of the interrupt. In an illustrative example, the address specifies one or more processors that will receive the interrupt. The interrupt controller processes the data to determine which interrupt to trigger on which processor and delivers the interrupt to the processor.

The MSI specification (as defined in PCI 2.2 Specification by Peripheral Component Interconnect Special Interest Group (PCI-SIG)) permits a peripheral device to allocate 1, 2, 4, 8, 16, or 32 interrupt vectors. The peripheral device may be configured with a memory address (e.g., the control register address of an interrupt controller), and a 16-bit device identifier. The peripheral device may write, to the specified address, an interrupt identifier produced by combining the interrupt vector number and the device identifier.

The MSI-X specification (as defined in PCI 3.0 Specification by PCI-SIG) allows a larger number of interrupts (up to 2048) and assigns, to each interrupt, a separate control register address and data word acting as the device identifier and interrupt vector identifier. The device driver may configure the physical device with an interrupt mapping table (also referred to as MSI-X table) comprising a plurality of interrupt mapping entries, such that each interrupt mapping entry comprises a message address (e.g., the control register address), message data (e.g., the interrupt vector identifier), and a vector control flag (to enable/disable sending MSI-X messages to the specified message address).

In common implementations, using message-signaled interrupts in multi-component peripheral devices (e.g., multi-queue network interface controllers) may involve allocating a dedicated interrupt vector per component associated with a certain CPU. Such an approach may not scale well in multi-processor systems employing processor architecture with a limited number of interrupt vectors available (e.g., x86 architecture only supports 256 interrupt vectors). In one example, the multi-processor computer system is a virtual machine, running inside a hypervisor and having multiple virtual devices with high interrupt vector counts.

Aspects of the present disclosure address the above noted and other deficiencies by providing a method of sharing message-signaled interrupt vectors in multi-processor computer systems. In accordance with one or more aspects of the present disclosure, the same interrupt vector may be assigned to two or more device components (e.g., queues of a multi-queue network interface controller). In various illustrative examples, the device components may be different queues of the same peripheral device, or different peripheral devices. In an illustrative example, the system software may program the entries of interrupt mapping tables associated with the respective device components, such that each interrupt mapping table entry would be configured to trigger an interrupt on a certain processor (a hardware processor or a virtual processor).

In certain implementations, a separate interrupt descriptor table (IDT) may be associated with each processor (e.g., each hardware processor of a computer system or a virtual processor of a virtual machine). The operating system may create interrupt descriptors in the first and second IDTs associated, respectively, with the first and second processors. Both interrupt descriptors may be associated with the same interrupt vector number, but may reference different interrupt service routines. Each of the interrupt service routines referenced by the respective interrupt descriptor may be programmed to process the hardware events associated with the first device component or the second device component, thus allowing for interrupt vector number sharing among several device components.

Alternatively, two or more processors (e.g., hardware processors or virtual processors) may share the same IDT. The operating system may associate, by a memory data structure (such as per-CPU data), each device component with a respective processor. The operating system may create an interrupt descriptor in the IDT shared by the processors. Responsive to an interrupt being triggered by a device component, the interrupt service routine invoked by the processor may use the memory data structure to retrieve the identifier of the device component associated with the current processor and process the hardware event associated with the identified device component.

Various aspects of the above referenced methods and systems are described in details herein below by way of examples, rather than by way of limitation.

FIG. 1 depicts a high-level component diagram of an examples computer system operating in accordance with one or more aspects of the present disclosure. Example computer system 100 may comprise one or more processors 120A-120N communicatively coupled to one or more memory devices 130 and two or more I/O devices (peripheral device controllers) 140A-140R via a system bus 150.

"Processor" or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Example computer system 100 may further comprise one or more interrupt controllers such as Advanced Programmable Interrupt Controllers (APICs) 160, including one local APIC per processor and one or more input/output (I/O) APICs connected to I/O devices 140. An APIC may be integrated within a processor or may be provided by a separate component.

Example computer system 100 may employ an in-band interrupt signaling mechanism, also referred to as message signaled interrupts (MSI), that involves transmitting, by a peripheral device, a message through the main data path (e.g., through the PCI bus). In an illustrative example, example computer system 100 may implement the MSI-X specification (as defined in PCI 3.0 Specification by PCI-SIG), in accordance to which a dedicated control register address and data word acting as the device identifier and interrupt vector identifier are assigned to each interrupt. A physical device may be configured, by the corresponding physical device driver, with an interrupt mapping table (also referred to as MSI-X table) comprising a plurality of interrupt mapping entries, such that each interrupt mapping entry comprises a message address (e.g., the control register address), message data (e.g., the interrupt vector identifier), and a vector control flag (to enable/disable sending MSI-X messages to the specified message address).

Interrupt manager component 182 running on example computer system 100 may implement the methods for sharing message-signaled interrupt vectors in multi-processor computer systems, in accordance with one or more aspects of the present disclosure. In certain implementations, interrupt manager component 182 may be implemented as a software component invoked by the kernel of the operating system 185. Alternatively, functions of interrupt manager component 182 may be performed by the kernel of the operating system 185.

Figure 2A:
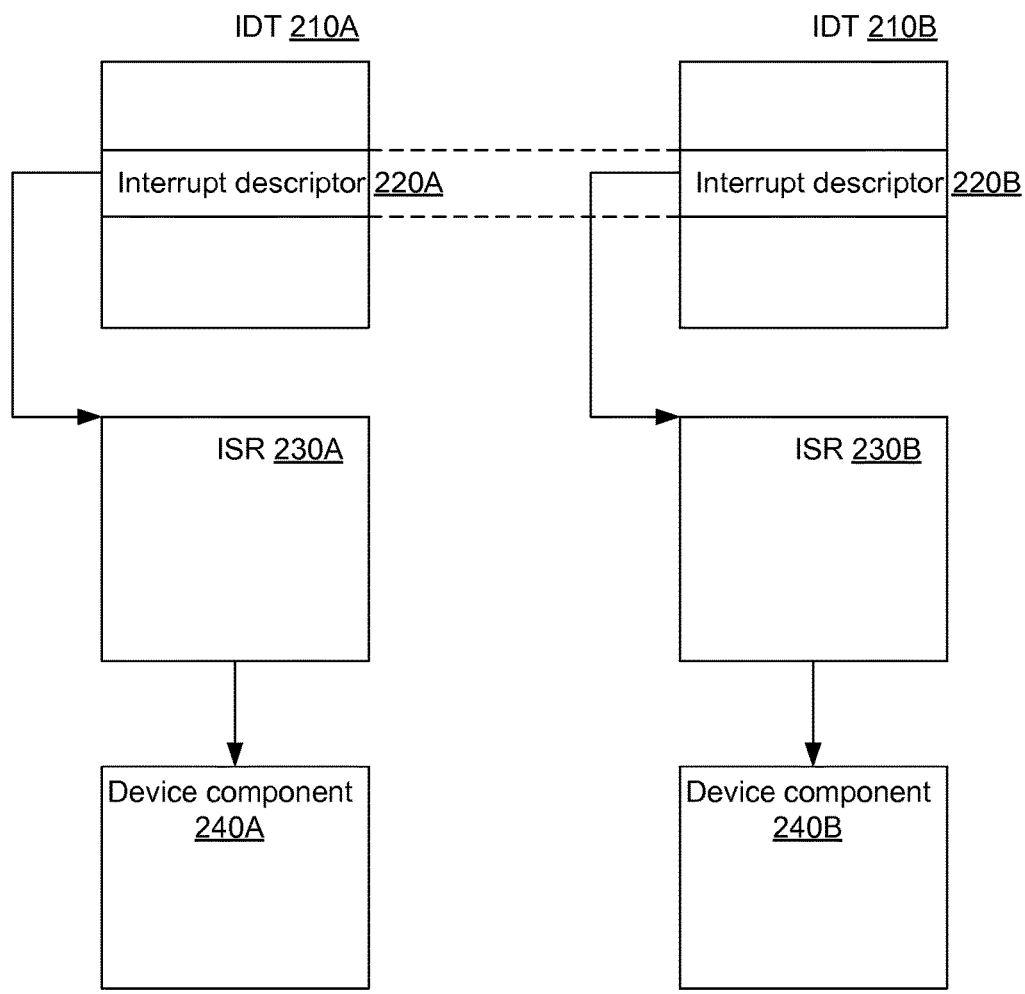
FIGS. 2A-2C schematically illustrate assigning the same interrupt vector to two or more device components, in accordance with one or more aspects of the present disclosure.
Figure 2B:
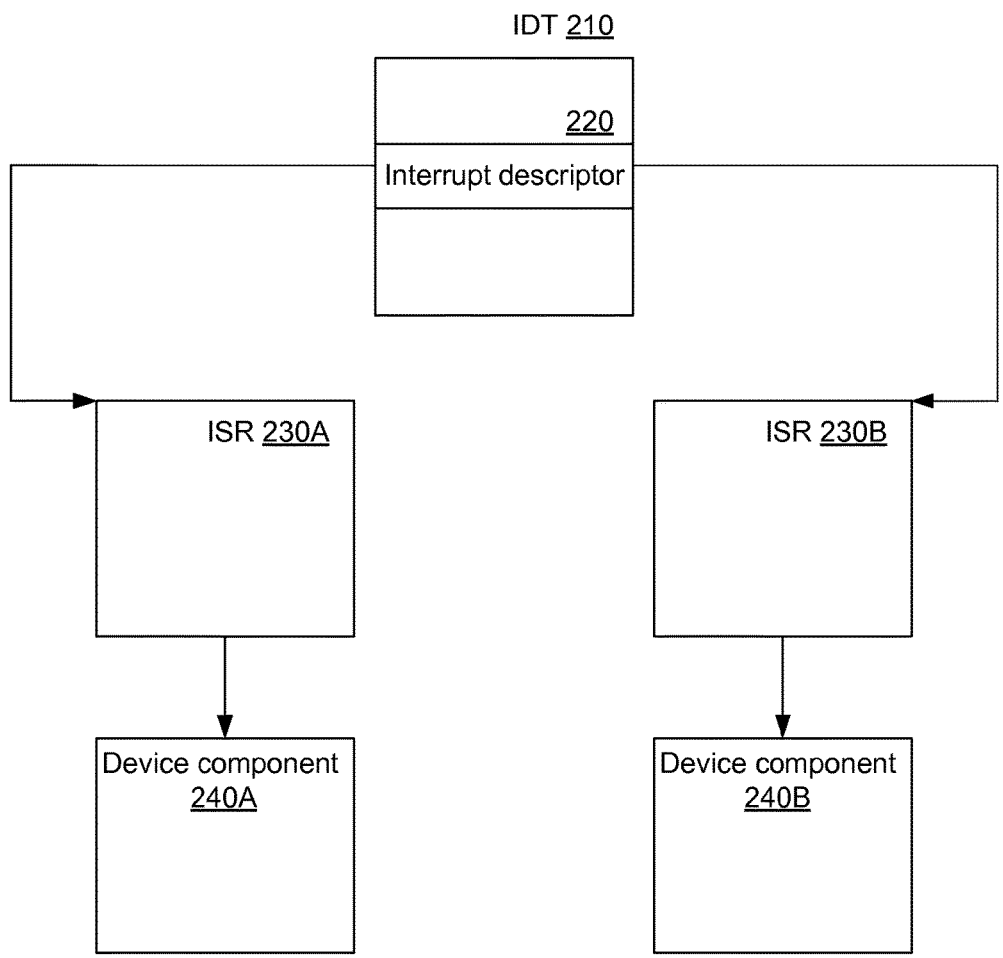
Figure 2C:
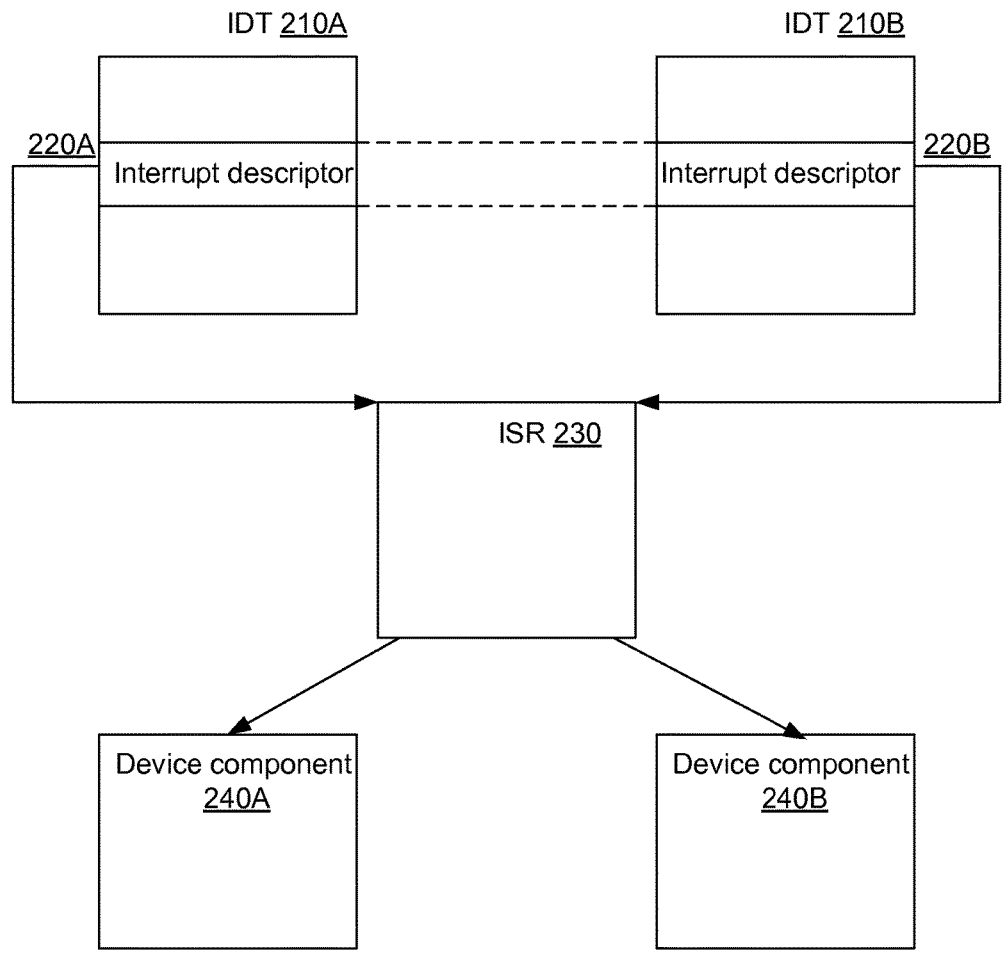

FIGS. 2A-2C schematically illustrate assigning the same interrupt vector to two or more device components, in accordance with one or more aspects of the present disclosure. In various illustrative examples, the device components may be different queues of the same peripheral device (e.g., queues of a multi-queue network interface controller 140) or different peripheral devices (e.g., network interface controllers 140A-140R). The system software may program the entries of interrupt mapping tables associated with the respective device components, such that each interrupt mapping table entry would be configured to trigger an interrupt on a certain processor (a hardware processor or a virtual processor). In various illustrative examples, the interrupt mapping table may be provided by an MSI table or an MSI-X table.

In an illustrative example, an interrupt mapping table associated with a peripheral device may comprise a plurality of interrupt mapping entries corresponding to a plurality of interrupt vectors assigned to the peripheral device. Each interrupt mapping entry may comprise a message address field, a message data field, and a vector control flag.

The message address field may specify a memory address to which the peripheral device should write certain data in order to trigger a message-signaled interrupt. In certain implementations, the message data field may specify the destination ID identifying the target processor(s) for receiving the message. In various illustrative examples, the message address field may further specify the redirection hint indication (whether the message should be directed to the processor with the lowest interrupt priority among the processors that can receive the interrupt) and/or the destination mode (whether the destination ID field should be interpreted as logical or physical APIC identifier).

The message data field may specify at least part of the data to be written by the peripheral device to the specified memory address. In certain implementations, the message data field may specify the interrupt vector. In various illustrative examples, the message data field may further specify the delivery mode (e.g., fixed mode, lowest priority mode, system management interrupt mode, or NMI mode), the trigger mode (edge or level-sensitive), and/or the signal level for the trigger mode (i.e., the state of the interrupt input for level-triggered interrupts).

The vector control flag may indicate whether the peripheral device may use the corresponding table entry for interrupt signaling: if the vector control flag is set, the peripheral device is prohibited from using the table entry for sending interrupt messages.

As schematically illustrated by FIG. 2A, a separate IDT 210A-210B may be associated with each processor (e.g., CPU 120A-120B of FIG. 1). Interrupt manager component 182 may create interrupt descriptors 220A-220B in the first and second IDTs 210A-210B. Both interrupt descriptors 220A-220B may be associated with the same interrupt vector number, but may reference different interrupt service routines 230A-230B. Each of interrupt service routines 230A-230B referenced by the respective interrupt descriptor 220A-220B may be programmed to process the hardware events associated with the respective device component 240A-240B, thus allowing for interrupt vector number sharing among several device components.

Alternatively, as schematically illustrated by FIG. 2B, two or more processors (e.g., CPU 120A-120B of FIG. 1) may share the same IDT 210. Interrupt manager component 182 may associate, by a memory data structure (such as per-CPU data), each device component 240A-240B with a respective processor 120A-120B. The operating system may create an interrupt descriptor 220 in the IDT shared by the processors. Responsive to an interrupt being triggered by a device component 240A or 240B, the operating system may use the memory data structure to identify a processor 120A or 120B to which the interrupt should be delivered. The interrupt service routine 230A or 230B invoked by the identified processor 120A or 120B may retrieve the identifier of the device component 240A-240B associated with the current processor 120A-120B and process the hardware event associated with the identified device component 240A-240B.

Alternatively, as schematically illustrated by FIG. 2C, a separate IDT 210A-210B may be associated with each processor (e.g., CPU 120A-120B of FIG. 1). Interrupt manager component 182 may create interrupt descriptors 220A-220B in the first and second IDTs 210A-210B. Both interrupt descriptors 220A-220B may be associated with the same interrupt vector number, and may reference an interrupt service routine 230. Interrupt manager component 182 may associate, by a memory data structure (such as per-CPU data), each device component 240A-240B with a respective processor 120A-120B. Responsive to an interrupt being triggered by a device component 240A or 240B, the operating system may use the memory data structure to identify a processor 120A or 120B to which the interrupt should be delivered. Interrupt service routine 230 invoked by the identified processor 120A or 120B may retrieve the identifier of the device component 240A-240B associated with the current processor 120A-120B and process the hardware event associated with the identified device component 240A-240B.

Figure 3A:
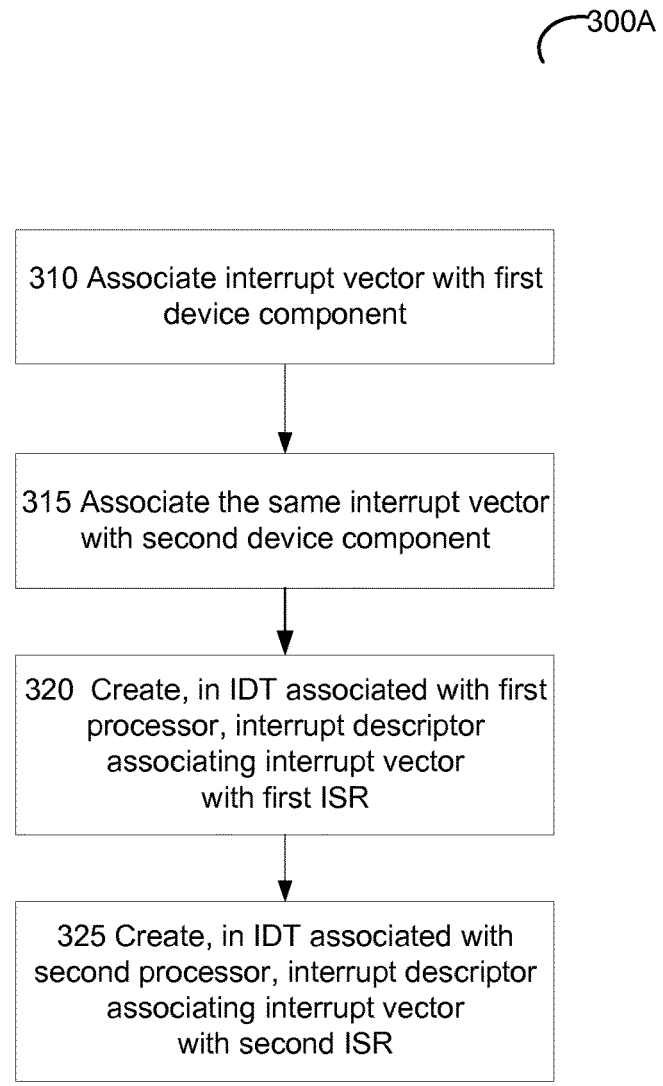
FIGS. 3A-3C depict flow diagrams of example methods for sharing message-signaled interrupt vectors in multi-processor computer systems, in accordance with one or more aspects of the present disclosure.

FIG. 3A depicts a flow diagram of an example method 300A for sharing message-signaled interrupt vectors in multi-processor computer systems, in accordance with one or more aspects of the present disclosure. Method 300A may be performed by a computer system that may comprise hardware (e.g., circuitry, dedicated logic, and/or programmable logic), software (e.g., instructions executable on a computer system to perform hardware simulation), or a combination thereof. Method 300A and/or each of its individual functions, routines, subroutines, or operations may be performed by one or more processors of the computer system executing the method. In certain implementations, method 300A may be performed by a single processing thread. Alternatively, method 300A may be performed by two or more processing threads, each thread executing one or more individual functions, routines, subroutines, or operations of the method. In an illustrative example, the processing threads implementing method 300A may be synchronized (e.g., using semaphores, critical sections, and/or other thread synchronization mechanisms). Alternatively, the processing threads implementing method 300A may be executed asynchronously with respect to each other.

At block 310, a processing device implementing the method may associate an interrupt vector with a first device component. In an illustrative example, the processing device may create an interrupt mapping entry of an interrupt mapping table associated with the first device component, such that the interrupt mapping entry comprises a control register address referencing the first processor and a data item referencing the interrupt vector, as described in more details herein above.

At block 315, the processing device may associate the same interrupt vector with a second device component. In various illustrative examples, the device components may be different queues of the same peripheral device or different peripheral devices. In an illustrative example, the processing device may create an interrupt mapping entry of an interrupt mapping table associated with the second device component, such that the interrupt mapping entry comprises a control register address referencing the second processor and a data item referencing the interrupt vector, as described in more details herein above.

At block 320, the processing device may create a first interrupt descriptor referencing the interrupt vector in a first IDT associated with a first processor. In various illustrative examples, the first processor may be provided by a hardware processor or a virtual processor. The first interrupt descriptor may specify an interrupt service routine to process an interrupt triggered by the first device component, as described in more details herein above.

At block 325, the processing device may create a second interrupt descriptor referencing the interrupt vector in a second IDT associated with a second processor. In various illustrative examples, the second processor may be provided by a hardware processor or a virtual processor. The second interrupt descriptor may specify an interrupt service routine to process an interrupt triggered by the second device component, as described in more details herein above.

Figure 3B:
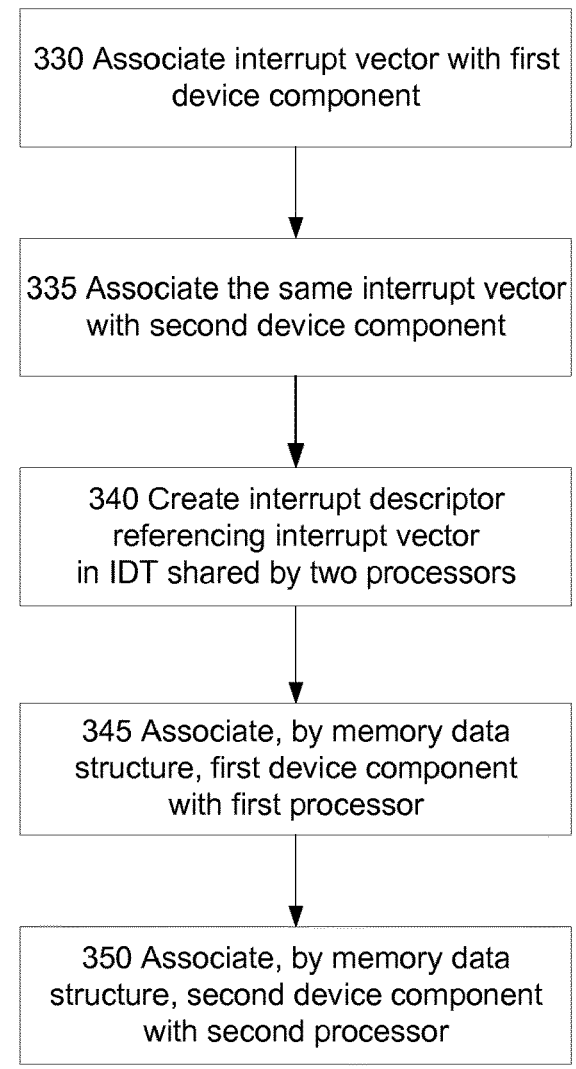

FIG. 3B depicts a flow diagram of an example method 300B for sharing message-signaled interrupt vectors in multi-processor computer systems, in accordance with one or more aspects of the present disclosure. Method 300B may be performed by a computer system that may comprise hardware (e.g., circuitry, dedicated logic, and/or programmable logic), software (e.g., instructions executable on a computer system to perform hardware simulation), or a combination thereof. Method 300B and/or each of its individual functions, routines, subroutines, or operations may be performed by one or more processors of the computer system executing the method. In certain implementations, method 300B may be performed by a single processing thread. Alternatively, method 300B may be performed by two or more processing threads, each thread executing one or more individual functions, routines, subroutines, or operations of the method. In an illustrative example, the processing threads implementing method 300B may be synchronized (e.g., using semaphores, critical sections, and/or other thread synchronization mechanisms). Alternatively, the processing threads implementing method 300B may be executed asynchronously with respect to each other.

At block 330, a processing device implementing the method may associate an interrupt vector with a first device component. In an illustrative example, the processing device may create an interrupt mapping entry of an interrupt mapping table associated with the first device component, such that the interrupt mapping entry comprises a control register address referencing the first processor and a data item referencing the interrupt vector, as described in more details herein above.

At block 335, the processing device may associate the same interrupt vector with a second device component. In various illustrative examples, the device components may be different queues of the same peripheral device or different peripheral devices. In an illustrative example, the processing device may create an interrupt mapping entry of an interrupt mapping table associated with the second device component, such that the interrupt mapping entry comprises a control register address referencing the second processor and a data item referencing the interrupt vector, as described in more details herein above.

At block 340, the processing device may create an interrupt descriptor in IDT shared by a first processor and a second processor. In various illustrative examples, the first processor and/or the second processor may be provided by a hardware processor or a virtual processor. The interrupt descriptor may specify interrupt service routines to be invoked by the first processor and the second processor, respectively, to process interrupt triggered by the first device component and the second device component, as described in more details herein above.

At block 345, the processing device may associate, by a first memory data structure, the first device component with the first processor.

At block 350, the processing device may associate, by a second memory data structure, the second device component with the second processor. In an illustrative example, the memory data structure may be provided by per-CPU data, as described in more details herein above.

Figure 3C:
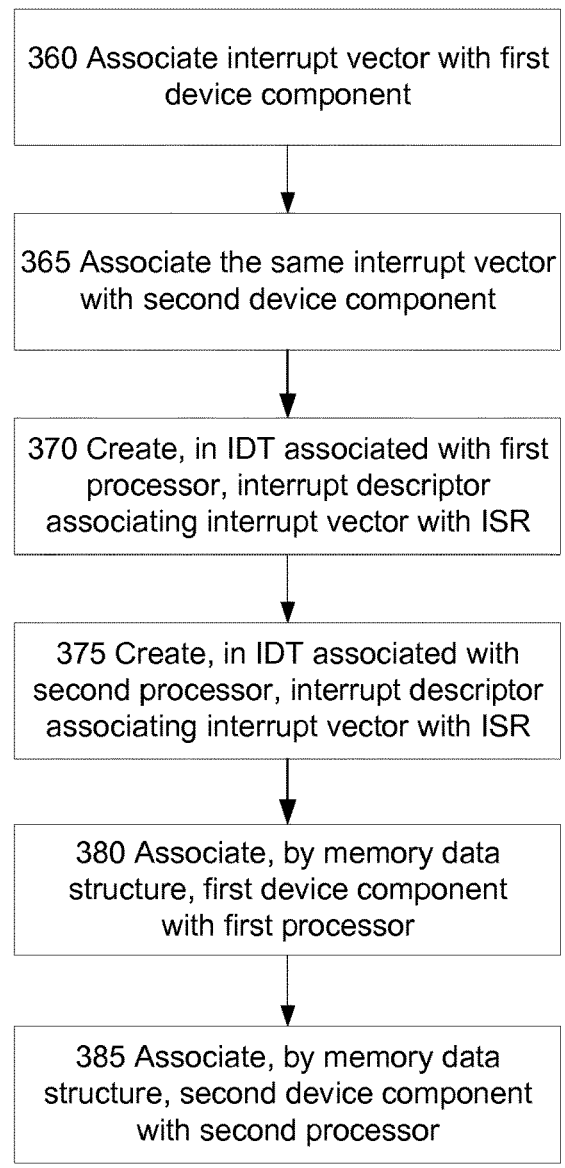

FIG. 3C depicts a flow diagram of an example method 300C for sharing message-signaled interrupt vectors in multi-processor computer systems, in accordance with one or more aspects of the present disclosure. Method 300C may be performed by a computer system that may comprise hardware (e.g., circuitry, dedicated logic, and/or programmable logic), software (e.g., instructions executable on a computer system to perform hardware simulation), or a combination thereof. Method 300C and/or each of its individual functions, routines, subroutines, or operations may be performed by one or more processors of the computer system executing the method. In certain implementations, method 300C may be performed by a single processing thread. Alternatively, method 300C may be performed by two or more processing threads, each thread executing one or more individual functions, routines, subroutines, or operations of the method. In an illustrative example, the processing threads implementing method 300C may be synchronized (e.g., using semaphores, critical sections, and/or other thread synchronization mechanisms). Alternatively, the processing threads implementing method 300C may be executed asynchronously with respect to each other.

At block 360, a processing device implementing the method may associate an interrupt vector with a first device component. In an illustrative example, the processing device may create an interrupt mapping entry of an interrupt mapping table associated with the first device component, such that the interrupt mapping entry comprises a control register address referencing the first processor and a data item referencing the interrupt vector, as described in more details herein above.

At block 365, the processing device may associate the same interrupt vector with a second device component. In various illustrative examples, the device components may be different queues of the same peripheral device or different peripheral devices. In an illustrative example, the processing device may create an interrupt mapping entry of an interrupt mapping table associated with the second device component, such that the interrupt mapping entry comprises a control register address referencing the second processor and a data item referencing the interrupt vector, as described in more details herein above.

At block 370, the processing device may create a first interrupt descriptor referencing the interrupt vector in a first IDT associated with a first processor. In various illustrative examples, the first processor may be provided by a hardware processor or a virtual processor.

At block 375, the processing device may create a second interrupt descriptor referencing the interrupt vector in a second IDT associated with a second processor. In various illustrative examples, the second processor may be provided by a hardware processor or a virtual processor. The first interrupt descriptor and the second interrupt descriptor may specify an interrupt service routine to be invoked by the first processor or the second processor to process interrupts triggered by the first device component or the second device component, respectively, as described in more details herein above.

At block 380, the processing device may associate, by a first memory data structure, the first device component with the first processor.

At block 385, the processing device may associate, by a second memory data structure, the second device component with the second processor. In an illustrative example, the memory data structure may be provided by per-CPU data, as described in more details herein above.

Figure 4:
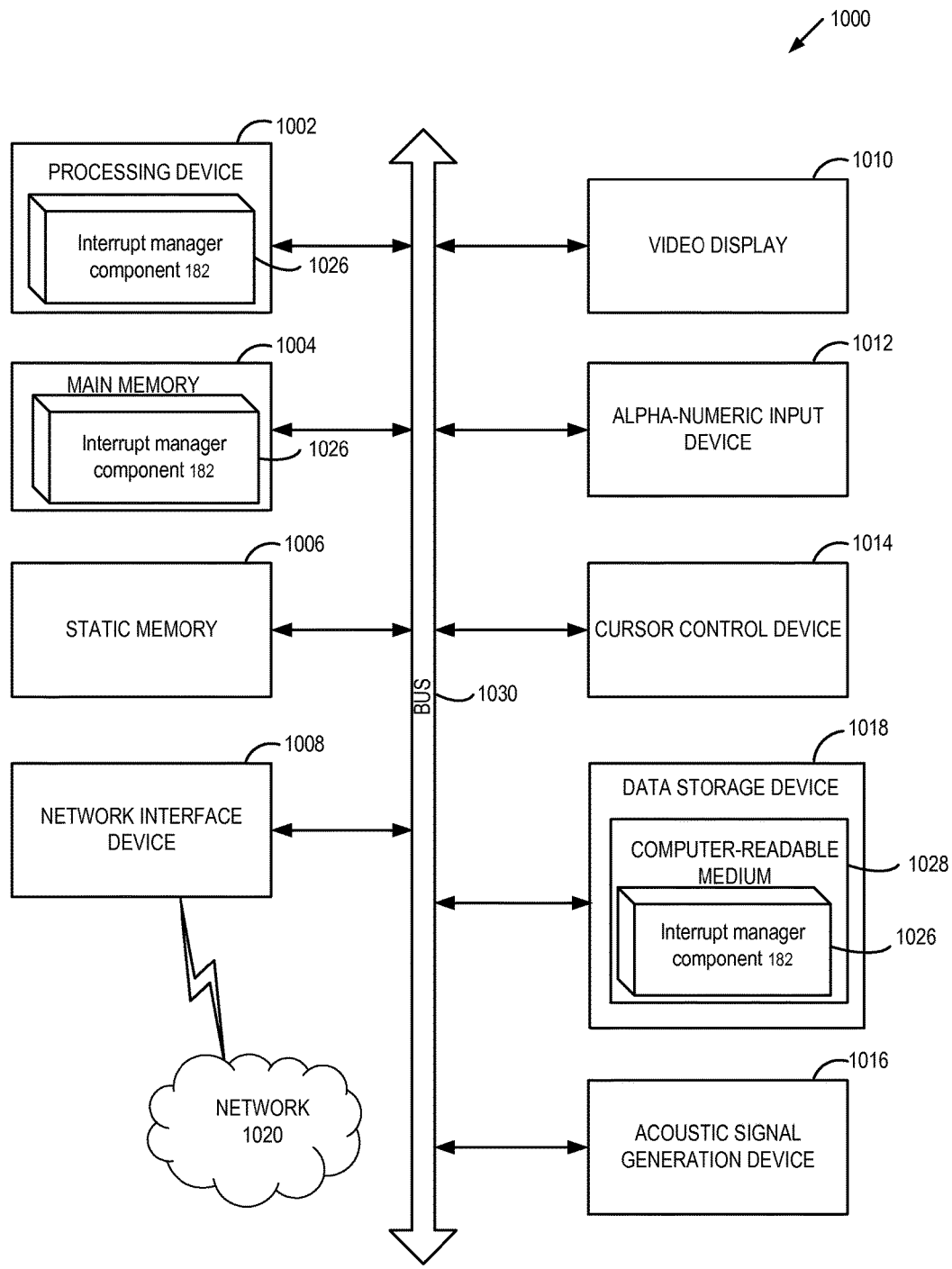
FIG. 4 depicts a block diagram of a computer system operating in accordance with one or more aspects of the present disclosure.

FIG. 4 schematically illustrates a component diagram of an example computer system 1000 which can perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute interrupt manager component 182 implementing methods 300A, 300B and/or 300C for sharing message-signaled interrupt vectors in multi-processor computer systems.

Example computer system 1000 may further comprise a network interface controller 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of interrupt manager component 182 implementing methods 300A, 300B and/or 300C for sharing message-signaled interrupt vectors in multi-processor computer systems.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface controller 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    associating an interrupt vector with a first device component, by creating a first interrupt mapping entry in a first interrupt mapping table, wherein the first interrupt mapping entry comprises a first control register address referencing a first processor, and further comprises a first data item referencing the interrupt vector;
    associating the interrupt vector with a second device component, by creating a second interrupt mapping entry in a second interrupt mapping table, wherein the second interrupt mapping entry comprises a second control register address referencing a second processor, and further comprises a second data item referencing the interrupt vector;

creating an interrupt descriptor for the interrupt vector in an interrupt descriptor table (IDT) associated with the first processor and the second processor;

associating, by a first memory data structure, the first device component with the first processor; and associating, by a second memory data structure, the second device component with the second processor.

2. The method of claim 1, wherein the first processor is provided by one of: a hardware processor or a virtual processor.

3. The method of claim 1, wherein the second processor is provided by one of: a hardware processor or a virtual processor.

4. The method of claim 1, wherein the first interrupt mapping table is provided by one of: a message-signaled interrupt (MSI) table or an extended message-signaled interrupt (MSI-X) table.

5. The method of claim 1, wherein the second interrupt mapping table is provided by one of: a message-signaled interrupt (MSI) table or an extended message-signaled interrupt (MSI-X) table.

6. A system, comprising:
a memory; and
a processing device, operatively coupled to the memory, to:
associate an interrupt vector with a first device component, by creating a first interrupt mapping entry in a first interrupt mapping table, wherein the first interrupt mapping entry comprises a first control register address referencing a first processor, and further comprises a first data item referencing the interrupt vector;
associate the interrupt vector with a second device component, by creating a second interrupt mapping entry in a second interrupt mapping table, wherein the second interrupt mapping entry comprises a second control register address referencing a second processor, and further comprises a second data item referencing the interrupt vector;
create, in an interrupt descriptor table (IDT) associated with the first processor and the second processor, an interrupt descriptor for the interrupt vector;
associate, by a first memory data structure, the first device component with the first processor; and
associate, by a second memory data structure, the second device component with the second processor.

7. The system of claim 6, wherein the first processor is provided by one of: a hardware processor or a virtual processor.

8. The system of claim 6, wherein the second processor is provided by one of: a hardware processor or a virtual processor.

9. The system of claim 6, wherein the first interrupt mapping table is provided by one of: a message-signaled interrupt (MSI) table or an extended message-signaled interrupt (MSI-X) table.

10. The system of claim 6, wherein the second interrupt mapping table is provided by one of: a message-signaled interrupt (MSI) table or an extended message-signaled interrupt (MSI-X) table.

11. A computer-readable non-transitory storage medium comprising executable instructions to cause a processing device to:
associate an interrupt vector with a first device component, by creating a first interrupt mapping entry in a first interrupt mapping table, wherein the first interrupt mapping entry comprises a first control register address referencing a first processor, and further comprises a first data item referencing the interrupt vector;
associate the interrupt vector with a second device component, by creating a second interrupt mapping entry in a second interrupt mapping table, wherein the second interrupt mapping entry comprises a second control register address referencing a second processor, and further comprises a second data item referencing the interrupt vector;
create an interrupt descriptor for the interrupt vector in an interrupt descriptor table (IDT) associated with the first processor and the second processor;
associate, by a first memory data structure, the first device component with the first processor; and
associate, by a second memory data structure, the second device component with the second processor.

12. The computer-readable non-transitory storage medium of claim 11, wherein the first processor is provided by one of: a hardware processor or a virtual processor.

13. The computer-readable non-transitory storage medium of claim 11, wherein the second processor is provided by one of: a hardware processor or a virtual processor.

14. The computer-readable non-transitory storage medium of claim 11, wherein the first interrupt mapping table is provided by one of: a message-signaled interrupt (MSI) table or an extended message-signaled interrupt (MSI-X) table.

15. The computer-readable non-transitory storage medium of claim 11, wherein the second interrupt mapping table is provided by one of: a message-signaled interrupt (MSI) table or an extended message-signaled interrupt (MSI-X) table.

* * * * *